Sept. 6, 1966  D. J. SIKORRA  3,271,567

CONTROL APPARATUS

Filed Oct. 11, 1962

INVENTOR.
DANIEL J. SIKORRA

BY

Roger W. Hensen
ATTORNEY.

United States Patent Office 3,271,567
Patented Sept. 6, 1966

3,271,567
CONTROL APPARATUS
Daniel J. Sikorra, Champlin, Minn., assignor to
Honeywell Inc., a corporation of Delaware
Filed Oct. 11, 1962, Ser. No. 229,791
5 Claims. (Cl. 235—195)

This invention relates to a control or computing device and more particularly concerns a four quadrant analog multiplier-divider device. Briefly, the invention is a device whereby an output signal is obtained which is inversely proportional to a first input signal and directly proportional to a second input signal. It is called a four-quadrant multiplier-divider because the quantities being operated with are not restricted as to algebraic sign. The only restrictions are that division by zero is forbidden and that the input signals must be properly phased. The invention depends upon a characteristic of a velocity generator or tachometer, viz, the variation of an output signal across the output winding proportional to the product of the angular velocity of the generator shaft and a control signal applied across the excitation winding.

In the past, the operation of multiplication and/or division has usually been performed with a combination of amplifiers, servos and follow-up potentiometers. This technique is commonly used in analog computers. Circuits using prior art techniques can be made fairly accurate, but they do not always exhibit the long term reliability needed in many applications, e.g., space applications. This is usually due to the failure of the follow-up potentiometers after extended use.

It is an object of this invention to provide improved computing apparatus.

It is another object of this invention to provide a four-quadrant multiplier-divider device using velocity generators rather than potentiometers so that greater reliability is achieved.

It is another object of this invention to provide a computing device with a speed of response inherently faster than that of a positional computing device.

It is a further object of this invention to provide a computing device wherein the output signal is stabilized against changes in bearing friction.

It is another object of this invention to provide an output signal that is inherently stabilized against temperature changes.

It is another object of this invention to provide an output signal which is inversely proportional to a first input signal and directly proportional to a second input signal.

It is another object of this invention to obtain stability inherent in a velocity control system, not as readily obtained in a positional system.

These and other objects will become apparent upon reading the specification, claims and drawings in which:

Figure 1:
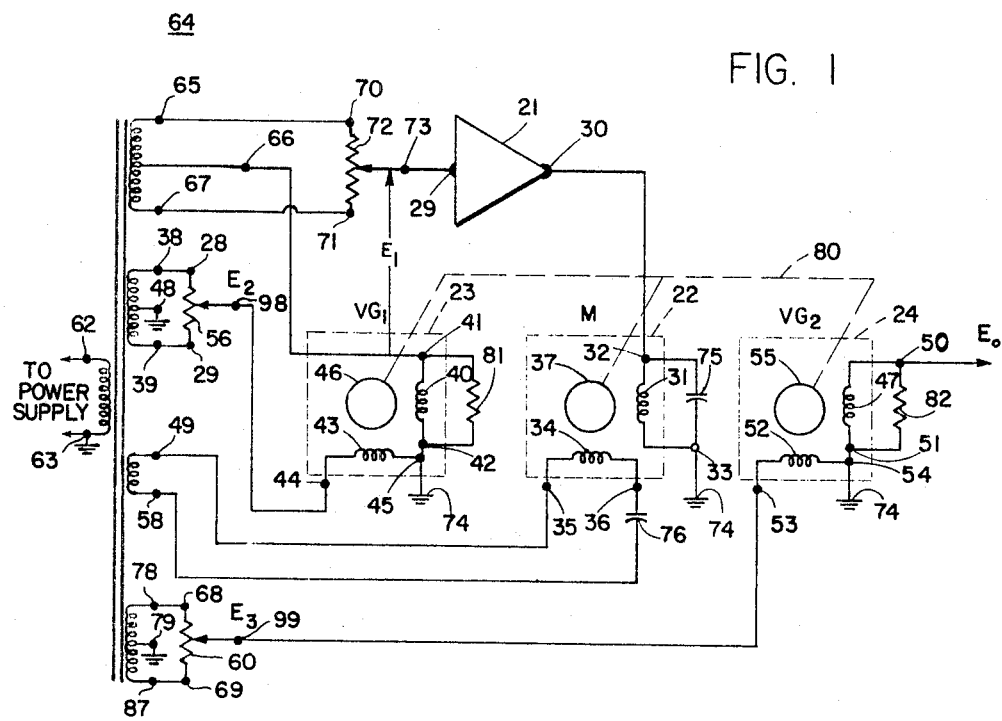
FIGURE 1 is a schematic diagram of an embodiment of the invention.

For the sake of clarity, in describing the invention illustrated in the drawings, specific terminology may be referred to, but it is not intended that the invention be limited to such specific terms as selected, but it is to be understood that each specific term includes all technical equivalents.

Referring to the specific embodiment of this invention illustrated in FIGURE 1, the main elements are a transformer 64, an amplifier 21, a motor 22, a first velocity generator or tachometer 23, and a second velocity generator or tachometer 24.

Transformer 64 has an input winding with terminals 62, 63 which are connected to a suitable power supply.

Transformer 64 has four windings on the output side, a first winding having terminals 65, 66, and 67, with terminal 66 being a center tap, a second winding having terminals 38, 48, and 39, with terminal 48 being a center tap, a third winding having terminals 49, 58, and a fourth winding having terminals 78, 79, and 87 with terminal 79 being a center tap.

Amplifier 21 has an input terminal 29 and an output terminal 30.

Motor 22 has a control winding 31 with terminals 32, 33, an excitation winding 34 with terminals 35, 36 and a rotor 37.

The first velocity generator 23 has an output winding 40 with terminals 41, 42, an excitation winding 43 with terminals 44, 45 and a rotor 46.

The second velocity generator 24, similar to the first velocity generator 23, has an output winding 47 with terminals 50, 51, an excitation winding 52 with terminals 53, 54 and a rotor 55.

The transformer 64 provides all the driving and signal power. Potentiometer 72 has end terminals 70, 71 and wiper terminal 73. Terminals 70, 71 are connected to terminals 65, 67 respectively of transformer 64; terminal 73 is connected to input terminal 29 of amplifier 21. The output terminal 30 of amplifier 21 is connected to terminal 32 of control winding 31 of motor 22. Terminal 33 of winding 31 is returned to ground 74. A phasing capacitor 75 is connected in shunt across winding 31. Terminal 35 of excitation winding 34 of motor 22 is connected to terminal 49 of transformer 64 and terminal 36 of excitation winding 34 is connected to terminal 58 of transformer 64 through a series phasing capacitor 76. Motor driving power is delivered to winding 34.

Terminal 41 of output winding 40 of velocity generator 23 is connected to center tap terminal 66 of transformer 64; terminal 42 is returned to ground 74. Resistor 81 shunts winding 40 and reduces the output noise of velocity generator 23. Terminal 45 of winding 43 is returned to ground 74 and terminal 44 is connected to wiper terminal 98 of potentiometer 56; end terminals 28, 29 of potentiometer 56 are connected to terminals 38, 39 respectively of the second output winding in transformer 64. Center tap terminal 48 is returned to ground.

Winding 52 of the second velocity generator 24 has terminal 54 returned to ground 74 and terminal 53 connected to wiper terminal 99 of potentiometer 60. Terminals 68, 69 of potentiometer 60 are connected to terminals 78, 87 respectively of the fourth output winding in transformer 64, center tap terminal 79 is returned to ground. Terminal 51 of winding 47 is returned to ground 74 and resistor 82 shunts winding 47; this resistor aids in reducing the output noise of velocity generator 24. The output of winding 47 appears at terminal 50.

Rotors 46, 37 and 55 of velocity generator 23, motor 22 and velocity generator 24 respectively are connected together by mechanical means 80 so that they all rotate simultaneously and at the same speed. In this embodiment the rotors are all mounted on the same shaft and are contained within a single housing.

A first input signal, designated $E_1$, is developed across potentiometer 72 and is picked off at wiper terminal 73, from here it is applied to input terminal 29 of amplifier 21.

A second input signal, designated $E_2$, is developed across potentiometer 56 and is picked off at wiper terminal 98. This signal is applied to the excitation winding 43 of velocity generator 23.

The third input signal, designated $E_3$, is developed across potentiometer 60 and is picked off at wiper terminal 99. This signal is applied to the excitation winding 52 of velocity generator 24.

A negative feedback signal, designated $E_y$, is developed across output winding 40 of velocity generator 23, and is in series with $E_1$.

$E_1$, $E_2$, and $E_3$ are normally continually varying. It is preferable that signals $E_2$ and $E_3$ be in time phase or exactly 180° out of phase with the motor fixed phase excitation delivered to winding 34 of motor 22, but operation is possible without this requirement.

Figure 2:
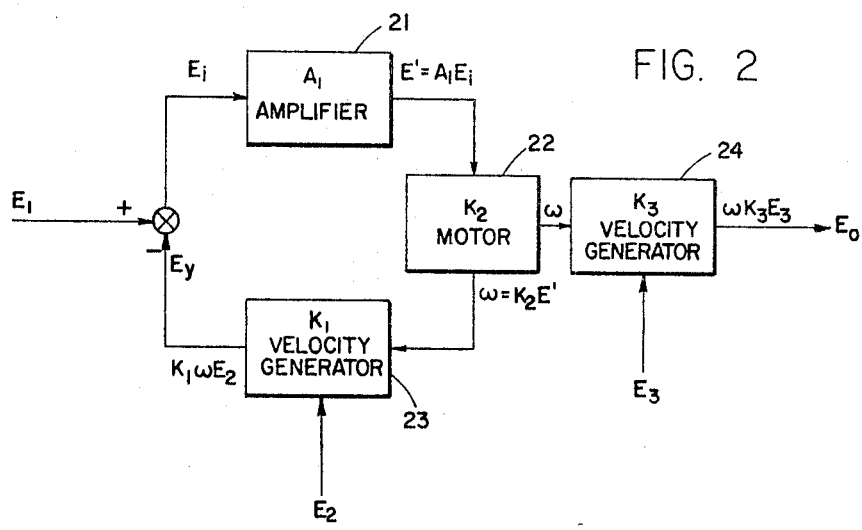
FIGURE 2 is a simplified block diagram of the invention useful in explaining the principles involved therein.

The theory of operation will be explained by referring to the simplified block diagram in FIGURE 2, where $E_1$, $E_2$ and $E_3$ are the input E.M.F. control signals, $E_y$ is a negative feedback E.M.F. signal, $E_i$ is the E.M.F. input signal to the amplifier, $A_1$ represents the gain of the amplifier, $E'$ is the E.M.F. output signal of the amplifier, $K_2$ is the ratio of the angular velocity $\omega$ of the motor to the E.M.F. control signal $E'$ and is a function of $E'$, $K_1$ represents the multiplying factor of the first velocity generator and is the ratio of the E.M.F. output signal $E_y$ to the product of the angular velocity $\omega$ and the E.M.F. control signal $E_2$, and $K_3$ is the multiplying factor of the second velocity generator and is the ratio of the E.M.F. output signal $E_o$ to the product of the angular velocity $\omega$ and the E.M.F. control signal $E_3$. The equations, specifying these relations are as follows:

(1) $\quad E_y = K_1 \omega E_2$
(2) $\quad \omega = K_2 E'$
(3) $\quad E_i = E_1 - E_y$
(4) $\quad E_o = K_3 \omega E_3$
(5) $\quad E' = A_1 E_i$ Substituting (3) in (5) the result is (6) $\quad E' = A_1 (E_1 - E_y)$ Substituting (1) in (6) the result is (7) $\quad E' = A_1 (E_1 - K_1 \omega E_2)$ Solving (2) for $E'$ and substituting in (7), the resulting equation is (8) $\quad \omega = K_2 A_1 (E_1 - K_1 \omega E_2)$ Solving (8) for $\omega$ (9) $\quad \omega = K_2 A_1 E_{1/1} + K_2 K_1 A_1 E_2$ If the gain $A_1$ of the amplifier is made large, then

(10) $\quad K_1 K_2 A_1 E_2 \gg 1$ and

(11) $\quad \omega \approx E_1 / K_1 E_2$

Then using relation (4) and substituting (11) for $\omega$

(12) $\quad E_o \approx K_3 E_1 E_3 / K_1 E_2$ and if $K_3 = K_1$ i.e., the velocity generators are identically matched and are linear

(13) $\quad E_o \approx E_1 E_3 / E_2$ which is the desired output.

The E.M.F. output signal $E_o$ is inherently stabilized against temperature changes. The output signal $E_y$ of the feedback velocity generator 23 will be assumed to decrease with increasing temperature. Since the negative feedback $E_y$ decreases, the amplifier output control signal $E'$ increases, which increases the motor speed, and thereby increases the output control signal $E_o$ of the second velocity generator 24 which because of the increasing temperature had an assumed equally decreasing output. This is assuming that the velocity generators are in a single housing, or at least are subject to the same ambient temperature. A single compact two bearing assembly containing the motor and both velocity generators on a single shaft is a likely embodiment. The device can be packaged in a relatively small sealed unit. This temperature compensation feature occurs with the best results in that range in which the temperature characteristics of both velocity generators are linear.

Using the same analysis, it will be shown that the E.M.F. output signal $E_o$ is insensitive to changes in bearing friction. Assume that the bearing friction increases. As this occurs, the output control signal will tend to decrease because the motor speed $\omega$ decreases, but the output signal $E_y$ of the first velocity generator also decreases, and since this signal is supplying negative feedback to the amplifier, the amplifier output will increase thereby increasing the motor speed and compensating for the original decrease in motor speed due to the increase of bearing friction. This assumes the amplifier gain $A_1$, can approach infinity with stability, which is substantially true.

Increased reliability is the greatest advantage gained by using this invention. This occurs because the life of a velocity generator is considerably longer than a follow-up potentiometer, an element that is common in the prior art devices used to obtain the operation of multiplication and division.

This device has a single order time delay, and because it is a speed control device rather than a positional control device, it has an inherently faster response time. It is inherently damped despite extremely high amplifier gain without the use of auxiliary damping networks.

The result obtained in the output circuit is an output voltage which is dependent upon three input voltages; this output voltage is directly proportional to the product of two of the said input voltages, and inversely proportional to the third said input voltage.

It is to be understood that the form of the invention herewith shown and described is to be taken as a preferred embodiment. Various equivalent elements can be substituted for those described. Specific terminology has been used, e.g., the term velocity generator, meaning a device that generates an output signal directly proportional to the product of its angular velocity and an excitation signal. It should be noted that potentiometers 72, 56, and 60 are merely illustrated signal sources. Signals can be a function of other type transducers or sources and it is to be understood that the spirit or scope of the invention is not to be limited by such terms.

Having thus described my invention, I claim:

1. A four quadrant analog multiplier-divider device comprising:
   an amplifier, having input and output circuits, capable of amplifying an input signal and controlling an electric motor, the input circuit being electrically connected to receive an input E.M.F.;
   an electric motor having a main field winding and a control winding, the control winding being connected in electrical circuit to receive control power from the output circuit of said amplifier, the main field winding being connected in electrical circuit to receive fixed phase excitation;
   a first tachometer, having an excitation winding and an output winding, mechanically connected to said electric motor so as to rotate at the same speed, the output winding of said first tachometer being connected in electrical circuit to the input circuit of said amplifier so as to provide a negative feedback signal, the excitation winding of said first tachometer being connected in electrical circuit with a first variable control signal; and
   a second tachometer, having an excitation winding and an output winding, mechanically connected to said electric motor so as to rotate at the same speed, the excitation winding of said second tachometer being connected in electrical circuit to receive a second variable control signal.

2. A four quadrant analog multiplier-divider device comprising:
   a power amplifier having input and output terminals;
   an electric motor having a control winding and a field winding;
   a first velocity generator having an excitation winding and an output winding;

a second velocity generator having an excitation winding and an output winding;
a first E.M.F. signal source;
a second E.M.F. signal source; a third E.M.F. signal source;
means connecting the input terminals of said power amplifier to receive an E.M.F. produced by said first source;
means electrically connecting the control winding of said electric motor to the output terminals of said amplifier whereby the electric motor is driven at a speed proportional to said first source;
means mechanically connecting said electric motor to said first velocity generator thereby rotating the first velocity generator at the same rate as said electric motor;
means connecting the excitation winding of said first velocity generator to receive a signal produced by said second signal source, thereby producing a signal across the output winding of said first velocity generator which is proportional to the product of the speed of rotation of said first velocity generator and the signal produced by said second signal source;
means connecting the input terminals of said power amplifier to receive, as negative feedback, the signal developed across the output winding of said first velocity generator, thereby resulting in the speed of rotation of said electric motor being directly proportional to the E.M.F. of said first signal source and inversely proportional to the signal produced by said second signal source; means mechanically connecting said second velocity generator to said electric motor thereby rotating said second velocity generator at the same rate as said electric motor; and means connecting the excitation winding of said second velocity generator to receive a signal produced by said third signal source, thereby resulting in an output voltage being developed across the output winding of said second velocity generator that is directly proportional to the product of the first signal source and the third signal source and inversely proportional to the second signal source.

3. A computing device comprising:
amplifying means having input and output means, said input means being adapted to receive an input signal voltage and a feedback signal voltage;
motor means electrically connected to the output means of said amplifying means to be controlled thereby;
a first velocity generator means mechanically connected to be driven by said motor means and electrically connected to the input means of said amplifying means to provide said feedback signal; and
second velocity generator means connected to be driven by said motor means.

4. A control device comprising:
amplifying means;
motor means connected to be controlled by said amplifying means;
first velocity generator means connected to be driven by said motor means and connected to said amplifying means to provide feedback; and
second velocity generator means connected to be driven by said motor means.

5. In control apparatus, the combination comprising:
a first E.M.F. signal source;
a second E.M.F. signal source;
a third E.M.F. signal source;
amplifying means having input and output means;
motor means having input means;
first velocity generator means having input and output means; and
second velocity generator means having input and output means, said first E.M.F. signal source connected to the input means of said amplifying means, the output means of said amplifying means connected to the input means of said motor means, said first velocity generator being driven by said motor means, the input means of said first velocity generator being connected to said second E.M.F. signal source and the output means of said second velocity generator being connected to the input means of said amplifying means to provide feedback, said motor means also driving said second velocity generator, the input means connected to said third E.M.F. signal source, with the output means of said second velocity generator developing an output signal which is directly proportional to the product of the signals from said first and third sources and inversely proportional to the signal from said second source.

References Cited by the Examiner
UNITED STATES PATENTS

| | | | |
|---|---|---|---|
| 2,963,224 | 12/1960 | McDonough | 235—196 |
| 2,967,018 | 1/1961 | Fogarty | 235—194 |
| 3,015,767 | 1/1962 | Taylor | 235—196 |
| 3,150,304 | 9/1964 | Armstrong et al. | 318—20.425 |
| 3,174,033 | 3/1965 | Seliger | 235—195 |

MALCOLM A. MORRISON, *Primary Examiner.*
A. J. SARLI, *Assistant Examiner.*